United States Patent [19]

Ma et al.

[11] 3,797,808
[45] Mar. 19, 1974

[54] PLASTICATION CONTROL SYSTEM FOR INJECTION MOLDING MACHINES

[75] Inventors: Carlton Y. W. Ma; John W. Peter, both of Cincinnati, Ohio

[73] Assignee: Cincinnati Milacron Inc., Cincinnati, Ohio

[22] Filed: Nov. 17, 1972

[21] Appl. No.: 307,294

Related U.S. Application Data

[62] Division of Ser. No. 83,072, Oct. 22, 1970, Pat. No. 3,721,512.

[52] U.S. Cl.................... 259/191, 222/63, 425/145
[51] Int. Cl............................. B29f 1/04, B29b 1/10
[58] Field of Search ......... 259/9, 10, 185, 186, 187, 259/188, 189, 190, 191, 192, 193, 194, 195; 264/40; 222/1, 55, 63; 425/140, 145, 148, 208

[56] References Cited
UNITED STATES PATENTS
3,693,946  9/1972  Merritt................................ 259/191

*Primary Examiner*—Harvey C. Hornsby
*Assistant Examiner*—Alan I. Cantor

[57] ABSTRACT

A plastication control system for controlling the shot size and plastication time of an injection molding machine. The control system includes a computer which calculates the screw speed based on the operating conditions of the immediately preceding cycle in order to control the plastication time to a predetermined value. Additionally, the system controls the back pressure applied to the rotating screw in order to maintain the melt temperature of the plastic at the forward end of the barrel at a predetermined value.

3 Claims, 3 Drawing Figures

3,797,808

PLASTICATION CONTROL SYSTEM FOR INJECTION MOLDING MACHINES

This is a division, of application Ser. No. 83,072, filed Oct. 22, 1970 now U.S. Pat. No. 3,721,512.

BACKGROUND OF THE INVENTION

This invention relates to injection molding machines and, more particularly, to a control system for controlling the plastication system of such a machine so that the shot size and plastication time are automatically controlled to provide the plastication time and shot size selected by by the machine operator.

In the operation of injection molding machines, plastication is accomplished in a heated barrel within which a screw is rotatably and translatably positioned. The material to be plasticated, which can be, for example, polyethylene, polystyene, polypropylene, ABS, and the like, is placed in a hopper at one end of the barrel where it is fed to the screw by means of gravity. The screw works the material, thereby heating it by friction, to soften it so it subsequently can be forcibly injected into a mold while it is in a viscous but fluid state. In addition to softening the material, the screw also conveys it axially along the barrel to the point where it is discharged therefrom.

Heretofore, the set-up and operation of an injection molding machine was accomplished almost entirely manually and required that the operator of the machine set the various parameters such as screw speed, screw back pressure, shot size, and the like manually in order to provide molded parts of the desired quality within the desired cycle operating time. Because those steps had to be accomplished manually, there was a considerable time period involved in setting up the machine to mold a given part since some of the control variables are, to a degree, interdependent, so that a change in one could very well result in a change in another.

It is thus desirable to provide a control system whereby the functions previously performed manually are performed automatically to assure more uniform operating cycles and thereby provide more uniform molded parts. It is an object of the present invention to provide such an automatic control system.

SUMMARY OF THE INVENTION

Briefly stated, in accordance with one aspect of the present invention, control system is provided for an injection molding machine having a plastication system which includes a screw rotatably and translatably positioned within a barrel for injecting plasticated material into a mold. The machine includes means for rotating and translating the screw within the barrel and the control system provides means for controlling both the translation and rotation of the screw so that the plastication is achieved within the desired time period and so that the temperature of the resulting melt is maintained at a constant predetermined value. Means for calculating the speed of rotation of the screw to be employed during the next succeeding operating cycle are provided in order to correct the system and achieve the predetermined plastication time.

DESCRIPTION OF THE PREFERRED EMBODIMENTS

Figure 1:
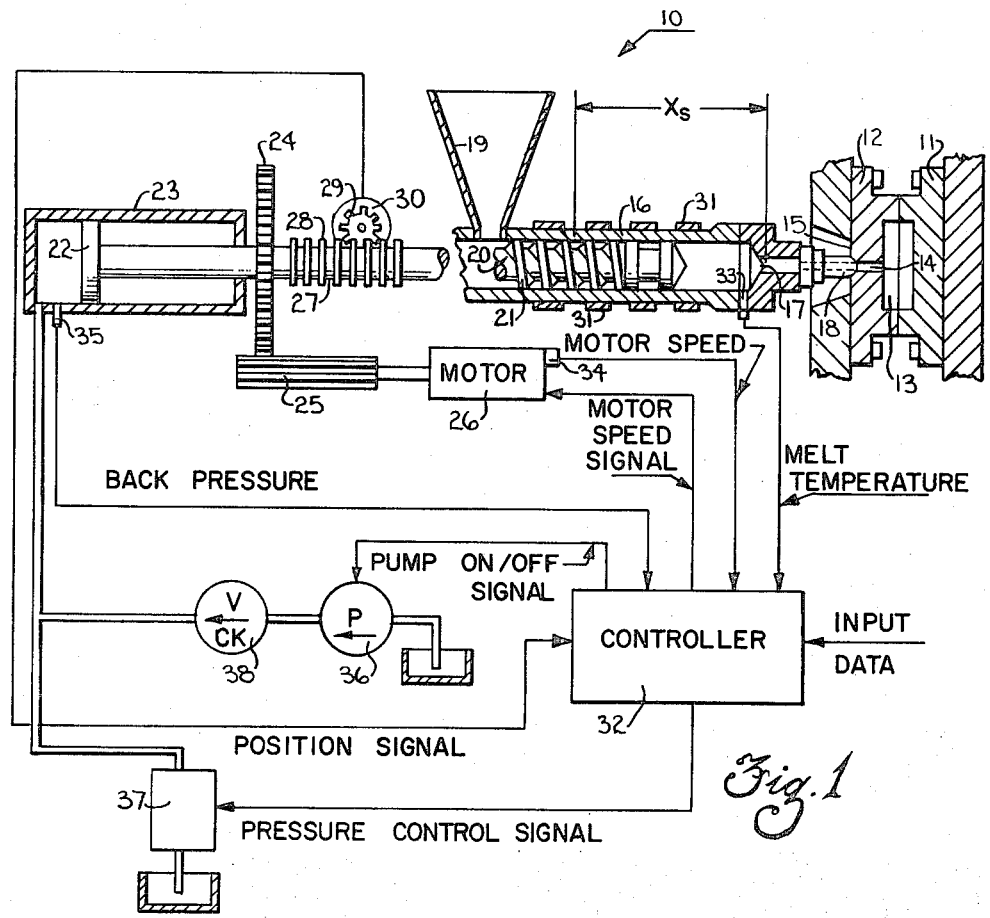
FIG. 1 is a schematic view of a portion of an injection molding machine showing the mold cavity and plastication system together with the several elements of the control system of the present invention.

Referring now to the drawings and particularly to FIG. 1 thereof, there is shown the plastication system 10 of an injection molding machine. The system includes a separable mold comprising a first mold portion 11 and a second mold portion 12 which when cooperatively engaged define a mold cavity 13 therebetween. Second mold portion 12 includes a passageway 14 providing communication between mold cavity 13 and the rear face 15 of second mold portion 12. Abutting rear face 15 of the second mold portion 12 is a generally cylindrical barrel 16 which can have a tapered end portion terminating in an aperture 17 which is aligned with passageway 14 and connected therewith by means of nozzle 18. If desired a shut-off valve (not shown) can be interposed between aperture 17 and passageway 14 in second mold portion 12 in order to permit communication between the interior of barrel 16 and mold cavity 13 only at predetermined times. As shown in FIG. 1, barrel 16 can include a hopper 19 into which the material to be plasticated is loaded.

Slidably and rotatably positioned within barrel 16 is a screw 20 which can be of a known construction familiar to those skilled in the art. The screw includes one or more external flights 21 which are helically disposed thereabout to cause the material to be transported within the barrel from hopper 19 to outlet aperture 17. Screw 20 includes a piston head 22 at its distal end, which piston head is surrounded by a cooperating cylinder 23 which when pressurized forces screw 20 in a forward direction toward outlet aperture 17 and thereby injects the plasticated material from within barrel 20 into mold cavity 13.

Screw 20 also includes a driven gear 24 keyed or otherwise secured thereto and which is in intermeshing relationship with a driving pinion 25 which, in turn, is driven by a suitable motor 26. Driving motor 26 can be either electrically or hydraulically driven, but a hydraulic motor is preferred from the standpoint of smooth operation. Also forming a part of screw 20 are a series of alternating circular grooves 27 and ridges 28 which are in engagement with a gear 29 which is attached to and drives a position transducer 30. The axial position of screw 20 is monitored by position transducer 30 which provides an electrical signal proportional thereto. Position transducer 30 can be, for example, a shaft angle encoder, a resolver, or the like.

In operation, the material to be plasticated is placed in hopper 19 and screw 20 is caused to rotate by means of motor 26. In the course of rotating, screw 20 performs mechanical work on the material to be plasticated thereby heating it and causing it to become soft and flowable. At the same time, it is also transporting the material forwardly within barrel 16 toward outlet aperture 17. Frequently, band type heaters 31 are provided around the exterior of barrel 16 in order to maintain the latter at a uniform high temperature and thereby prevent heat loss from the plasticated material to the surrounding atmosphere. As the plasticated material is transported forwardly it accumulates in front of screw 20 and causes it to move rearwardly with increasing accumulation of molten material. When screw 20 has retracted a distance $X_s$ which provides a volume of molten plasticated material sufficient to fill mold cavity 13, the rotation of screw 20 is stopped and hydraulic pressure is applied to the rear face of piston 22 attached to screw 20, thereby causing screw 20 to move forwardly toward outlet aperture 17 and consequently forcing the plasticated material through aperture 17, nozzle 18, passageway 14, and into mold cavity 13. Subsequently, the material in mold cavity 13 is permitted to cool, whereupon the plastication cycle begins once again.

As is shown in FIG. 1, the control system of the present invention includes a controller 32, which will be hereinafter described in further detail, to which input data are provided. The input data can comprise the desired melt temperature, the desired plastication time, the desired retraction of the screw $X_s$, which is related to the shot size, and an initial estimate of the back pressure to be maintained on screw 20 in order to insure that the material to be plasticated is worked to the extent that it reaches a temperature adequate to permit it to readily flow and completely fill mold cavity 13.

Information supplied to controller 32 by the system includes the melt temperature, which is sensed by a melt temperature transducer 33, the motor speed, which is sensed by a tachometer 34, the back pressure in cylinder 23, which is sensed by means of a pressure transducer 35, and the linear position of screw 20, which is sensed by position transducer 30.

Outputs from controller 32 include a motor speed control signal, which controls whether motor 26 is on or off and also its rotational speed, which is maintained constant during a cycle, and also a signal to a pump 36, which provides hydraulic pressure to cylinder 23 in order to cause screw 20 to move forwardly and thereby inject the plasticated material into mold cavity 13. During the time that plastication is taking place, the back pressure within cylinder 23 is controlled by means of a pressure control valve 37, such as, for example, a throttle valve, the position of which is determined by the melt temperature in the forward part of the barrel. A check valve 38 is provided in the hydraulic system to prevent back flow through pump 36 and thereby insures that pressure control valve 37 controls the pressure within cylinder 23.

Figure 2:
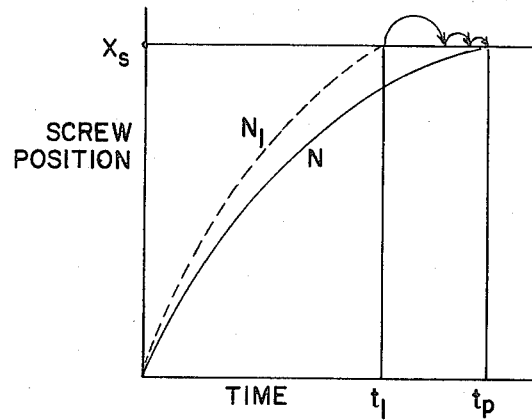
FIG. 2 is a graph showing the linear position of the screw in the barrel as a function of time and also as a function of the screw rotational speed.

The position of screw 20 as a function of time is shown in FIG. 2 for a given screw speed N. As shown, $X_s$ is the desired shot size or screw retraction distance and $t_p$ is the desired plastication time. Screw speed N would be the speed necessary to operate the screw across a retraction distance $X_s$ to achieve plastication within the time $t_p$. However, the likelihood of initially selecting the proper speed is small and, therefore, the present system provides for iteration from an initially selected speed $N_1$, shown as a dashed line in FIG. 2, until the value N is achieved, at which point the plastication system operates to provide the desires shot size $X_s$ within the desired plastication time $t_p$. The iteration is accomplished while maintaining $X_s$ constant so that the changes in screw speed provide the necessary changes in plastication time to achieve the desired plastication time.

Figure 3:
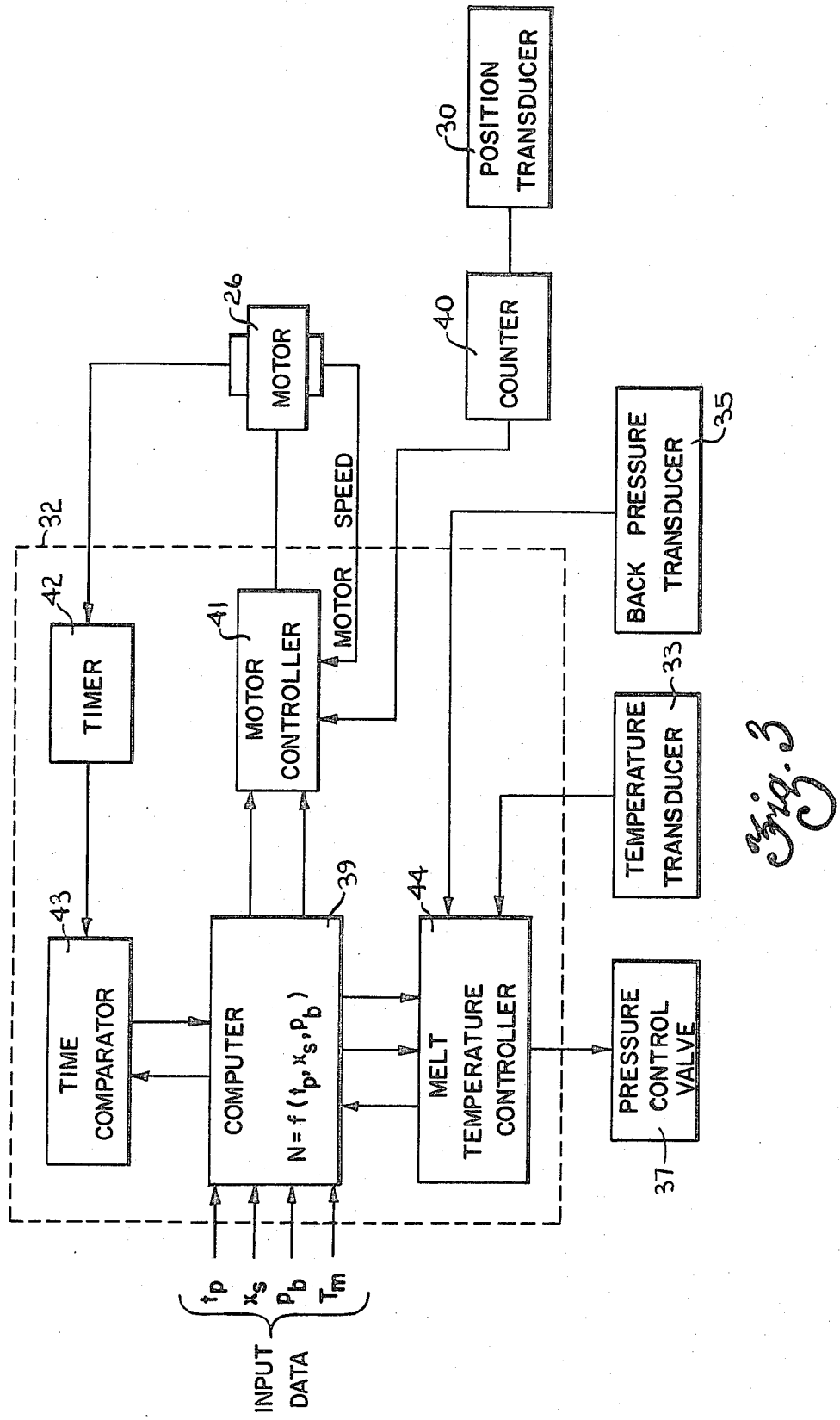
FIG. 3 is a block diagram showing in further detail the controller forming a part of the control system shown in FIG. 1 and illustrating the several inputs and control loops therein.

Controller 32 shown in FIG. 1 is shown in further detail within the dashed lines of FIG. 3. The heart of the system is a computer means 39 programmed to calculate the screw rotational speed N based on an equation which is a function of plastication time, shot size, and back pressure. For any given injection molding machine having a defined screw geometry and utilizing a given material, the equation for screw speed can be determined empirically. The relationship between screw rotational speed, shot size, plastication time, and back pressure can be approximated as follows:

$$N = A\, X_s/t_p\, [\, B = P_b\, ]$$

Where $N$ is screw rotational speed in rpm $X_s$ is desires shot size in inches of screw retraction $t_p$ is calculated trial plastication time in seconds $P_b$ is back pressure on the screw in psi and $A$ and $B$ are constants for a given screw and material For example, for a Model 375–32 CINCINNATI[R] injection molding machine including a screw having a 2.25:1 compression ratio and a 16:1 L/D positioned within a 2.75 inch diameter barrel and processing impact polystyrene, the equation for screw rotational speed is as follows:

$$N = 0.334\, X_s/t_p\, [\, 695 + P_b\, ]$$

Computer means 39 can be an arithmetic computer of the digital type such as, for example, a Model CIP 2000 computer manufactured by Cincinnati Milacron Inc. Similarly other computer devices can be employed as long as they are capable of performing the necessary computation of screw speed utilizing the several operating parameters provided by the control system.

The initial rotational speed, $N_1$, for the first cycle of the machine is calculated utilizing the input quantities of desired plastication time, desired shot size, and an initial estimate of the necessary back pressure to maintain the desired melt temperature. Computer means 39 calculates a rotational speed N which is maintained constant during that operating cycle. When screw 20 has retracted a distance equal to $X_s$, position transducer 30 senses that position and provides a signal to motor controller 41 through a counter 40 which counts the pulses provided by the position transducer 30. In motor controller 41, the instantaneous position of screw 20 is compared with $X_s$ and motor 26 is permitted to operate until screw 20 has retracted a distance equal to $X_s$. When the latter condition has been reached motor controller 41 stops the rotation of motor 26. Meanwhile, the time during which motor 26 has been in operation has been measured by the timer 42, which provides a signal proportional to that operating time to a time comparator 43 which compares the actual plastication time with the desired plastication time, $t_p$, subtracts the two to determine the error and takes half that error and adds it to the time for the preceding cycle to set the trial plastication time for the next succeeding cycle. The calculated trial plastication time is then combined with the new back pressure measured during the preceding cycle and a new screw rotational speed $N$ is calculated. This speed is then used for the succeeding cycle and subsequent corrections are applied until the actual plastication time is equal to the desired plastication time. In the meantime, a melt temperature controller 44 has been setting pressure control valve 37 to maintain the temperature sensed by temperature transducer 33 at a predetermined value. The back pressure necessary to achieve that temperature is measured by the back pressure transducer 35, which provides a signal to computer 39 through melt temperature controller 44.

Thus, computer 39 continually receives information from the injection molding machine and adjusts operating conditions so as to maintain the shot size and plastication time constant for the steady-state condition. Additionally, the control system also maintains melt temperature at the desired value by controlling the back pressure applied to the screw. It can thus be seen that any changing condition will be immediately reflected in corrections to the system to maintain the operation thereof at the predetermined levels. The net result is that the parts produced by an injection molding machine which includes the control system of the present invention are of much more uniform, high quality than if the control of the machine was accomplished manually. Furthermore, the time for setting up the machine to the predetermined operating conditions is significantly reduced since the control automatically compensates for differences in measured values and also any interaction effects which may take place when one variable is changed.

While particular embodiments of the invention have been illustrated and described it will be apparent to those skilled in the art that various changes and modifications can be made without departing from the spirit and scope of the invention and it is intended to cover in the appended claims all such changes and modifications that are within the scope of this invention.

What is claimed is:

1. A method of controlling the operation of an injection molding machine which includes a plastication system comprising a plastication screw rotatably and translatably positioned within a barrel, said method comprising:
   a. rotating said screw at a constant speed until the desired volume of plasticated material has been processed;
   b. measuring the plastication time within which said screw has been rotated to provide said desired volume of plasticated material;
   c. comparing the measured plastication time with a desired plastication time and generating a time correction signal proportional to the difference therebetween;
   d. computing a new screw rotational speed for the next succeeding operating cycle based on said time correction signal to provide the desired volume of plasticated material within the desired plastication time.

2. The method of claim 1 including the additional step of applying a back pressure to said rotating screw to maintain the temperature of said plasticated material at a predetermined level.

3. The method of claim 1 wherein said speed computation is based on the following formula:

$$N = A\, X_s/t_p\, [\, B + P_b\, ]$$

where $N$ is the screw rotational speed in rpm $X_s$ is the desired shot size in inches of screw retraction $t_p$ is the calculated trial plastication time in seconds $P_b$ is the back pressure on the screw in psi and A and B are constants for a given screw and material.

* * * * *